Patented Jan. 24, 1933

1,895,238

UNITED STATES PATENT OFFICE

WALTER E. VAIL, OF WILMINGTON, DELAWARE, ASSIGNOR TO E. I. DU PONT DE NEMOURS & COMPANY, OF WILMINGTON, DELAWARE, A CORPORATION OF DELAWARE

PROCESS FOR THE PREPARATION OF FORMIC ACID

No Drawing.   Application filed December 31, 1931. Serial No. 584,295.

This invention relates to a process for the preparation of formic acid from carbon monoxide and steam and is directed particularly to the use of a new catalyst for the reaction.

It has been known that carbon monoxide and steam will react, in the presence of a suitable catalyst, to give formic acid. As this process is one which employs raw materials that are relatively inexpensive, it should, under favorable conditions, produce the acid at an exceptionally low cost. Its commercial success, however, will in no small part be determined by the catalyst used. Those which have been proposed heretofore have not been entirely satisfactory for commercial operation due to low yield, short life, and other economic considerations. Efforts of investigators in this art have been directed, therefore, to the discovery of catalysts having high activity and which, furthermore, favor the production of formic acid while tending to inhibit the formation of undesirable side products.

An object of the present invention is to provide new catalysts for the preparation of formic acid from carbon monoxide and steam having the above desirable characteristics. Other objects will hereinafter appear.

According to the present invention formic acid is prepared from carbon monoxide and steam by contacting these materials in the vapor phase with a boron phosphate catalyst. This catalyst may be supported or not, as desired, altho generally it is preferable to support it on the usual type of catalyst supports such, for example, as charcoal, fuller's earth, kieselguhr, etc.

The carbon monoxide required for this synthesis may conveniently be derived from various commercial sources, such as, for example, water-gas, producer gas, etc., by liquefaction or other methods, and should likewise for the best results be relatively pure. Inert gases, such as nitrogen, carbon dioxide, etc., may be included with the reactants, altho this is usually undesirable as the reaction equilibrium is such that in order to obtain satisfactory conversion the partial pressures of the reactants should be high.

I prefer generally to conduct the reaction at pressures in excess of atmospheric, say from 100–1000 atmospheres or higher. The reaction proceeds over a wide range of temperatures employing the above described catalyst, depending upon the gaseous composition employed. The desired conversion of the carbon monoxide and steam to formic acid can be obtained at a temperature of from 100–400° C., although I usually prefer to conduct the reaction in the range of from 200–300° C.

The following example will illustrate one method of practising the invention, altho the invention is not limited thereto.

Example.—A gaseous mixture containing 69 parts by volume of carbon monoxide and 25 parts by volume of steam was passed into a catalytic reaction chamber, suitable for conducting exothermic gaseous reactions, containing a boron phosphate catalyst supported on charcoal. The catalyst was prepared in the following manner: 7.4 parts by weight of boric acid was dissolved in hot water and the resulting solution mixed with 12.6 parts by weight of 85% phosphoric acid. The volume was then made up to 60 parts by weight with water. Fifty parts by weight of hot activated charcoal was thoroughly impregnated with this solution, at boiling temperature, and the thus impregnated charcoal finally dried at 120° C. The prepared catalyst was then disposed in a reaction chamber suitable for conducting exothermic reactions. The reaction was conducted at a temperature of 325° C. and a presure of 700 atmospheres. The yield of formic acid, determined by analysis of the condensate, obtained by cooling the reaction products, was more than 50% of the theoretical.

The apparatus which may be employed for conducting the reaction may be of any conventional type and preferably one in which the temperature can be readily controlled. Owing to the corrosive action of formic acid, the interior of the converter and conduits therefrom should preferably be protected. This may be accomplished by using glass or glass-lined apparatus or by coating the inner surfaces of the apparatus with silver or using for the construction of this equipment acid-resisting alloys of, for example, molybdenum, cobalt, tungsten, chromium, manganese, or nickel.

Various changes may be made in the method of employing the above catalyst for the preparation of formic acid from carbon monoxide and steam without departing from this invention or sacrificing the advantages that may be derived therefrom.

I claim:

1. In a process of producing formic acid from a gaseous mixture containing carbon monoxide and steam, the step which comprises effecting the reaction in the presence of a boron phosphate catalyst.

2. In a process of producing formic acid from a gaseous mixture containing carbon monoxide and steam, the step which comprises effecting the reaction in the presence of a boron phosphate catalyst supported on activated charcoal.

3. In a process of producing formic acid from a gaseous mixture containing carbon monoxide and steam, the step which comprises passing the gaseous mixture over a boron phosphate catalyst.

4. In a process of producing formic acid from a gaseous mixture containing carbon monoxide and steam, the step which comprises passing the gaseous mixture over a boron phosphate catalyst supported on activated charcoal.

In testimony whereof I affix my signature.

WALTER E. VAIL.